UNITED STATES PATENT OFFICE.

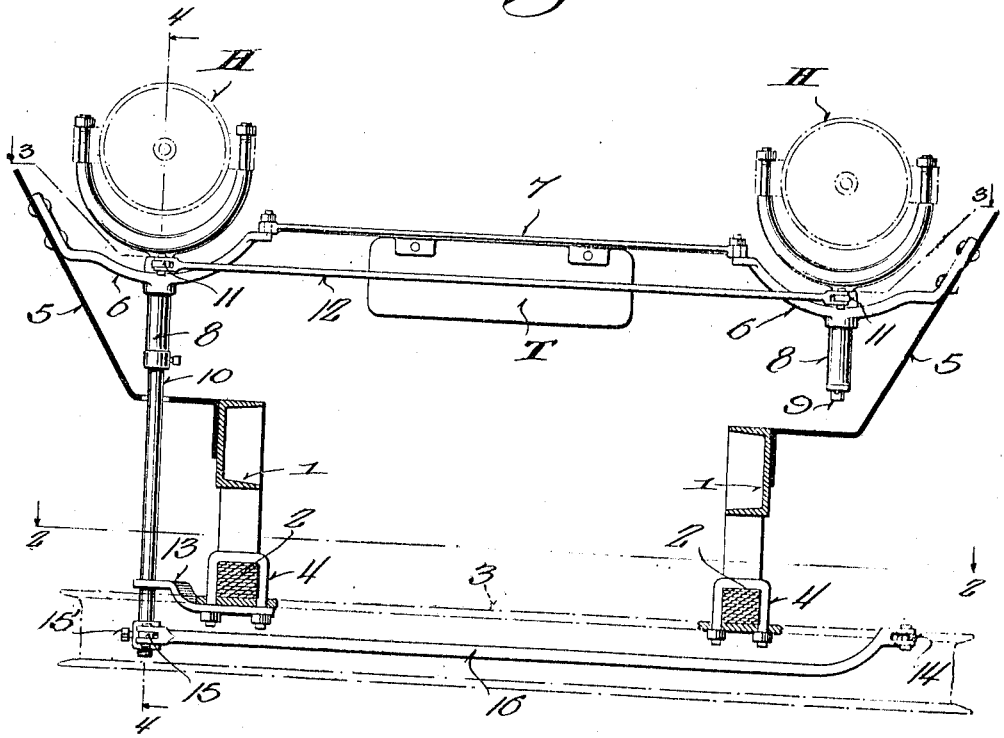

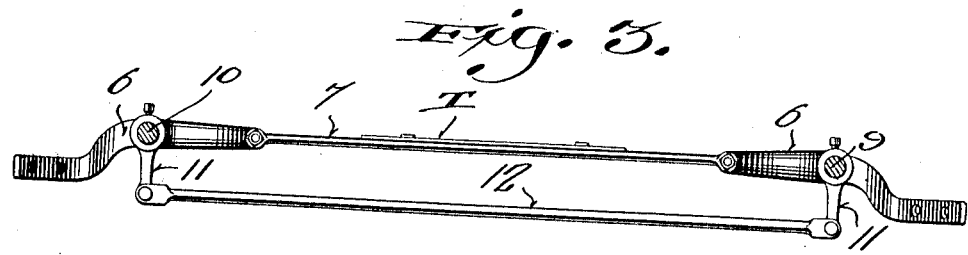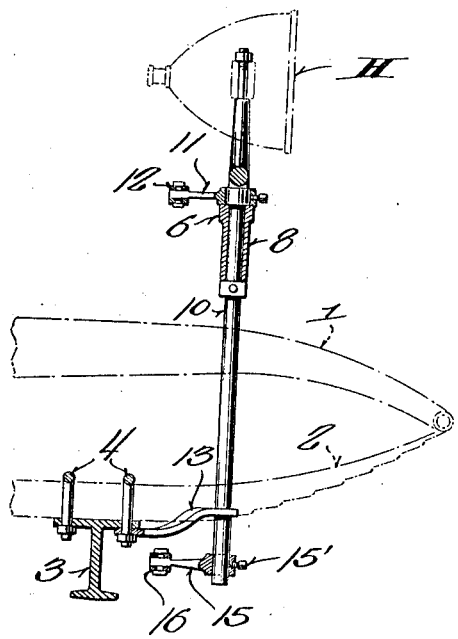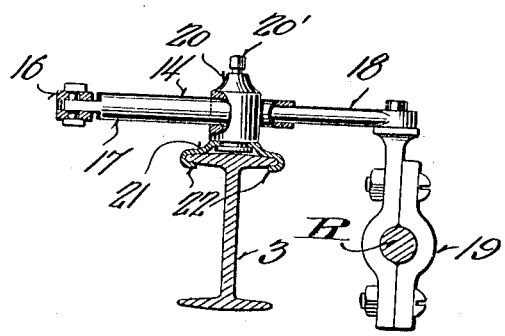

ANTON A. BORSSE AND GEORGE PIRC, OF SHEBOYGAN, WISCONSIN.

DIRIGIBLE HEADLIGHT.

1,270,256.

Specification of Letters Patent.   Patented June 25, 1918.

Application filed January 9, 1918. Serial No. 210,960.

*To all whom it may concern:*

Be it known that we, ANTON A. BORSSE and GEORGE PIRC, citizens of the United States, and residents of Sheboygan, in the county of Sheboygan and State of Wisconsin, have invented certain new and useful Improvements in Dirigible Headlights; and we do hereby declare that the following is a full, clear, and exact description thereof.

Our invention relates to new and useful improvements in headlights for automobiles and other vehicles including street-cars and locomotives.

The principal object of the present invention is to provide simply constructed and efficient dirigible headlights which can be readily mounted upon vehicles of various types and sizes.

Another object of the invention is to provide an adjustable extensible connection between the lamp actuating rod and the means for directing the movement of the headlights, such means in an automobile being the usual spindle connecting rod.

With these and other objects which will appear as the description progresses, the invention resides in the novel features of construction, combination and arrangement of parts which will be hereinafter more particularly described and claimed and shown in the drawings, wherein:

Figure 1 represents a vertical transverse sectional view through the forward end of a motor vehicle, said section being taken substantially on the plane of the line 1—1 of Fig. 2.

Fig. 2 is a horizontal section taken substantially on the plane of the line 2—2 of Fig. 1.

Fig. 3 is a similar view on the plane of the line 3—3 of Fig. 1.

Fig. 4 is a vertical section on the line 4—4 of Fig. 1, and

Fig. 5 is an enlarged detail sectional view on the line 5—5 of Fig. 2.

In the illustrated embodiment of our invention the same is mounted upon an automobile or similar motor vehicle, the same including channeled side sills 1 supported upon semi-elliptical leaf springs 2 which in turn are mounted on axles, one of which is shown at 3. The springs are preferably secured to the front axle 3 by means of inverted U-shaped clips 4. The usual fenders 5 are secured to the sills 1 in any preferred manner.

In vehicles of this general type headlights H are preferably supported by brackets 6 secured to the adjacent portions of the fenders 5, these brackets in the present instance are made in the form of inwardly extending arms which have their adjacent ends connected with a brace rod 7 on which may be mounted a license tag T. Inasmuch as our invention relates to dirigible headlights, the arms 6 are each provided with a depending sleeve 8, said sleeves receiving lamp standards 9 and 10, upon the forked upper ends of which the headlights H are disposed. Each of the standards 9 and 10 is provided above the arms or brackets 6 with a laterally extending crank arm 11, the same being connected together by a link in the form of a rod 12 whereby the headlights will revolve in unison.

In order that the movement of the headlights may be controlled through the steering of the vehicle, the standard 10 is of considerable length and projects downwardly through an opening in one fender 5 to a point adjacent the axle 3. This lower end of the standard is rotatably and slidably supported in a bracket 13 which projects from beneath one spring 2 and is held in engagement therewith by one U-shaped clip 4. This last mentioned bracket serves to prevent any tendency of the lamp standard to wabble and otherwise securely supports the same.

In the present exemplification of our invention the ordinary spindle connecting rod R is used for imparting changes in direction of travel of the vehicle to the lamp standard 10, this movement being transmitted through a lever 14, a crank 15 and an actuating rod 16 which connects said lever and crank. The lever 14 is preferably formed of two telescoping parts 17 and 18 whereby the same mechanism can be readily used on vehicles in which the connecting rod R is an indeterminate distance away from the axle 3. The part 18 is the one which is adapted to slide within the other part, the same being adjustably, yet rigidly secured to the rod R by a clamp 19.

The other portion 17 of the lever 14 is disposed in a post 20 which is swiveled in an attaching plate 21 as clearly shown in Fig. 5. This plate is adapted to have its free ends bent around the upper flange of the axle 3 as illustrated at 22. The portion 17 of the lever is capable of longitudinal movement through the post 20, but is held in adjusted position with respect thereto by a set screw 20'. The lever 14 is thus in effect pivoted intermediate its ends upon the axle 3.

The crank 15 hereinbefore referred to is adjustably attached by means of a set screw 15' to the lower end of the standard, while the actuating rod 16 is pivoted at one end to this crank and at its other end to one end portion of the part 17 of said lever 14. By this construction it will be seen that longitudinal movement of the connecting rod R will rock the lever 14 in either direction and consequently shift the actuating rod 16 longitudinally to move the crank 15. Such movement will obviously revolve the standard 10 and through the link 12 the standard 9.

From the foregoing those skilled in the art will note that a very simply constructed yet very efficient dirigible headlight mechanism has been produced, such mechanism being of such a nature that it may be readily used on various types of vehicles without radical changes.

Having thus described our invention we claim:

The combination with a vehicle including an axle, spring clips, a connecting rod and fenders, of a bracket secured to one of said fenders, a lamp standard rotatable in said bracket, a lamp on one end of the standard, a crank on the other end of the standard, a second bracket secured to one of said spring clips, said bracket slidably and rotatably receiving the lower end of said standard, a plate secured to said axle, a post swiveled in said plate, an extensible lever adjustably secured in said post, a rod connecting said crank and one end of the lever, and a connection between the other end of said lever and said connecting rod.

In testimony that we claim the foregoing we have hereunto set our hands at Sheboygan, in the county of Sheboygan and State of Wisconsin.

ANTON A. BORSSE.
GEORGE PIRC.

Copies of this patent may be obtained for five cents each, by addressing the "Commissioner of Patents, Washington, D. C."